United States Patent [19]

Jankiewicz

[11] 4,262,379
[45] Apr. 21, 1981

[54] AUTOMATICALLY SURFACING MARKER BUOY FOR LOBSTER OR CRAB TRAPS OR THE LIKE

[76] Inventor: Walter J. Jankiewicz, 441 El Camino Real, Encinitas, Calif. 92024

[21] Appl. No.: 936,399

[22] Filed: Aug. 24, 1978

[51] Int. Cl.³ .................... B63B 21/52; B63B 51/02
[52] U.S. Cl. ................................. 9/8 R; 9/9; 43/100; 114/326; 102/10
[58] Field of Search ............ 43/100, 102; 102/10, 102/13; 9/8 R, 8.3 R, 8.3 E, 9, 10; 114/333, 336, 326, 328, 329

[56] References Cited

U.S. PATENT DOCUMENTS

| | | | |
|---|---|---|---|
| 2,949,853 | 8/1960 | Vogt | 102/10 |
| 3,228,332 | 1/1966 | Snyder | 102/13 |
| 3,622,962 | 11/1971 | Winget | 9/8 R |
| 4,141,295 | 2/1979 | Campbell | 102/10 |
| 4,142,442 | 3/1979 | Tuten | 102/21 S |

Primary Examiner—Trygve M. Blix
Assistant Examiner—D. W. Keen
Attorney, Agent, or Firm—Duane C. Bowen

[57] ABSTRACT

A marker buoy attached to an object such as a lobster or crab trap by a latch and released by a trigger struck by a falling weight. A sealed buoy compartment contains a first permanent magnet holding the weight in upper position by a supportive pole relationship to the poles of a second permanent magnet on the weight and releasing the weight when the first magnet is pivoted to a relative position of poles not sufficiently supportive of the weight. The first magnet is pivoted by an electric motor controlled by an electric clock. Setting of the clock and other operations are accomplished without disturbing compartment seals by an external hand-held magnet operating on internal magnetic reed switches. A line tethers the buoy to the object when the latch is released.

20 Claims, 6 Drawing Figures

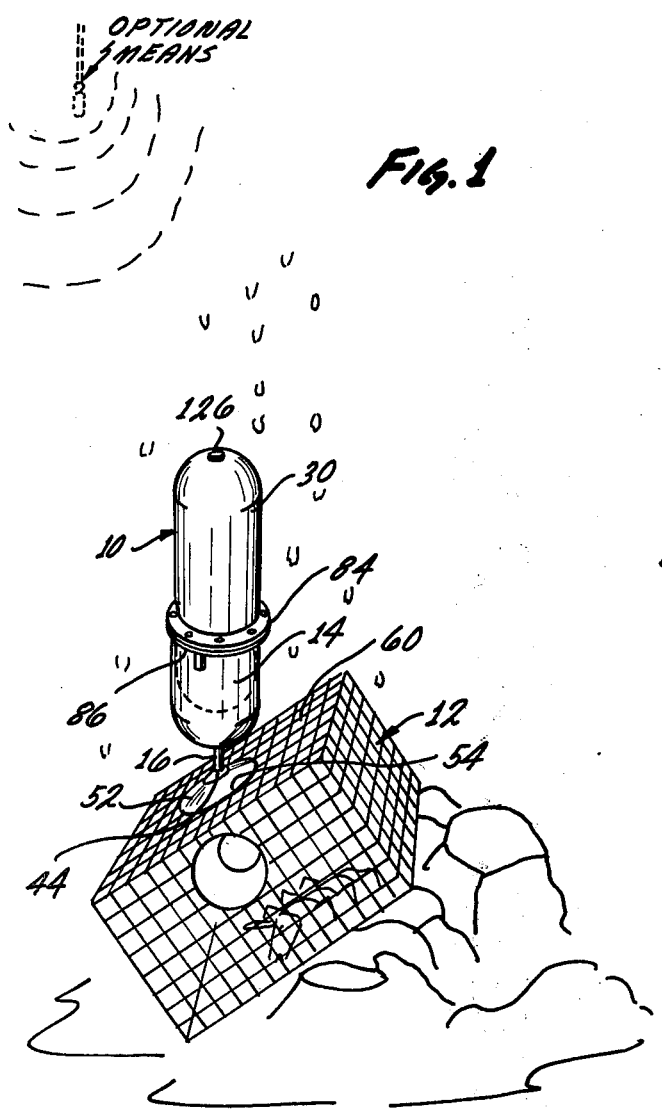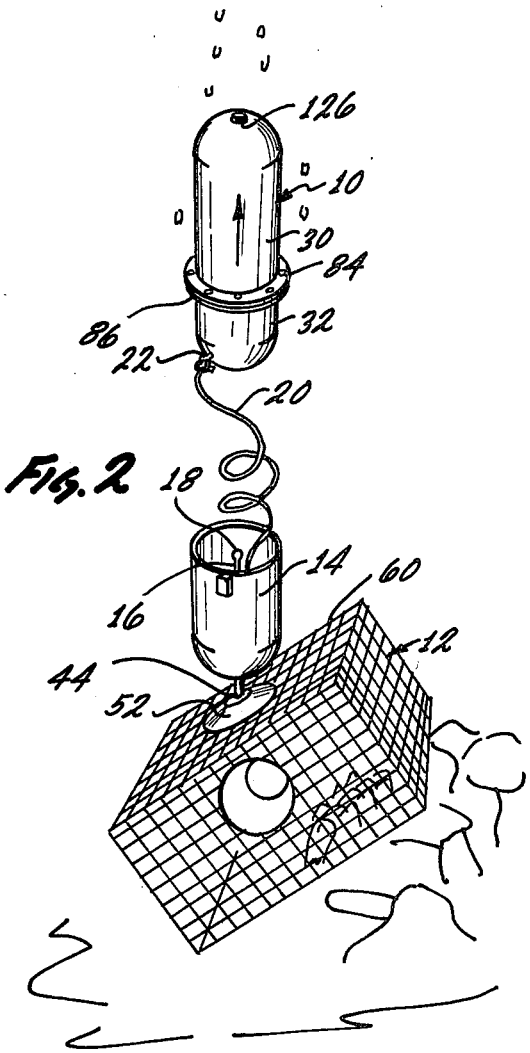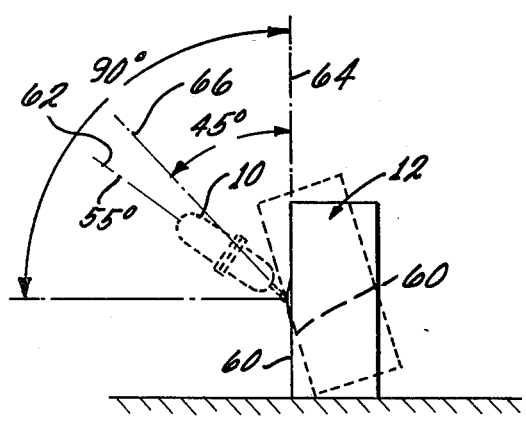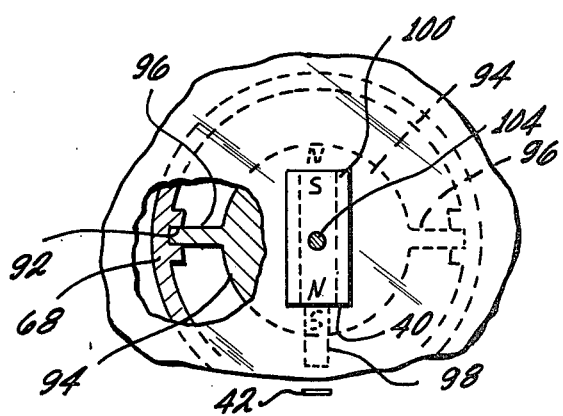

AUTOMATICALLY SURFACING MARKER BUOY FOR LOBSTER OR CRAB TRAPS OR THE LIKE

BRIEF SUMMARY OF THE INVENTION AND OBJECTIVES

My invention relates to a marker buoy attached to a lobster or crab trap or the like and surfacing when desired, particularly at a preset time.

A preliminary examination search conducted relative to the present invention disclosed the following patents with which I was not familiar: U.S. Pat. No. 3,889,307 concerns a buoy used in offshore drilling operations which is connected to an object placed on the ocean floor by means of a wire rope or the like wound on a drum and triggered to raise by an acoustical signal. U.S. Pat. No. 3,162,870 has an anchored light buoy automatically released from a sinking vessel and unwinding a nylon line tethering the buoy. U.S. Pat. No. 2,722,019 concerns a cable-anchored channel marking buoy surfacing automatically after a predetermined period of submersion. U.S. Pat. No. 4,034,693 concerns a device for raising fish traps, crayfish pots, etc., timed or triggered acoustically, rendered buoyant by explusion of water by gas from a cylinder. U.S. Pat. No. 3,871,044 concerns improvements in a timing and release device for such marking buoys. U.S. Pat. No. 3,729,755 concerns means automatically to divide and moor an oceanographic buoy system.

One objective of my invention is to provide an improved automatically surfacing marker buoy for lobster or crab traps or the like. One reason for this type of buoy, as distinguished from a buoy tethered to such a trap but always surfaced, is concealment of the trap from poachers. Other needs or objectives for buoys in that usage include: economy of manufacture to a suitable price range which is low relative to price ranges applicable to some other applications for such buoys, such as military usages; reliability of operation and low maintenance and particularly in a salt water environment; economy by using an off-the-shelf type battery-powered clock and by using an off-the-shelf type battery-powered motor; sealing of the compartment having delicate parts such as timers and motors; to set a timer without penetration of the sealed compartment and to perform other functions by use of magnetically operated reed switches internally of the compartment and hand-held magnets externally of the compartment; to provide means to read voltage externally of the compartment; to provide means to automatically surface the buoy in case of leakage or clock failure; to devise means to conserve the electricity of batteries powering the various systems; to devise a flashing light suitably powered; and to provide reliable and economical means for latching of the buoy to the trap and for release of the same, including providing for operation without breaking the seal of the compartment.

My invention will be best understood, together with additional objectives and advantages thereof, from the following description read with reference to the drawings, in which:

FIG. 1 is a perspective view of a specific embodiment of my new automatically surfacing buoy. The buoy is seen attached to a lobster trap that is resting on the rocky bottom of a body of water. A source of an acoustical signal is shown in the upper left hand corner.

FIG. 2 is a view like that of FIG. 1 but showing release of the buoy from attachment to the trap, while the buoy remains tethered to the trap with a line.

FIG. 3 is an elevational view, on reduced scale, showing the angular limits of operability of the buoy depending on tilting of the trap as it rests on the bottom of a body of water. The angular limit of operability depends partly on the structure of the specific embodiment used to mount the buoy on the trap and used to latch the buoy in place, and a different configuration could have a somewhat different angular limit.

FIG. 5 is a fragmentary view of certain details taken generally on line 5—5 of FIG. 4.

ATTACHMENT OF BUOY TO TRAP

Figure 4:
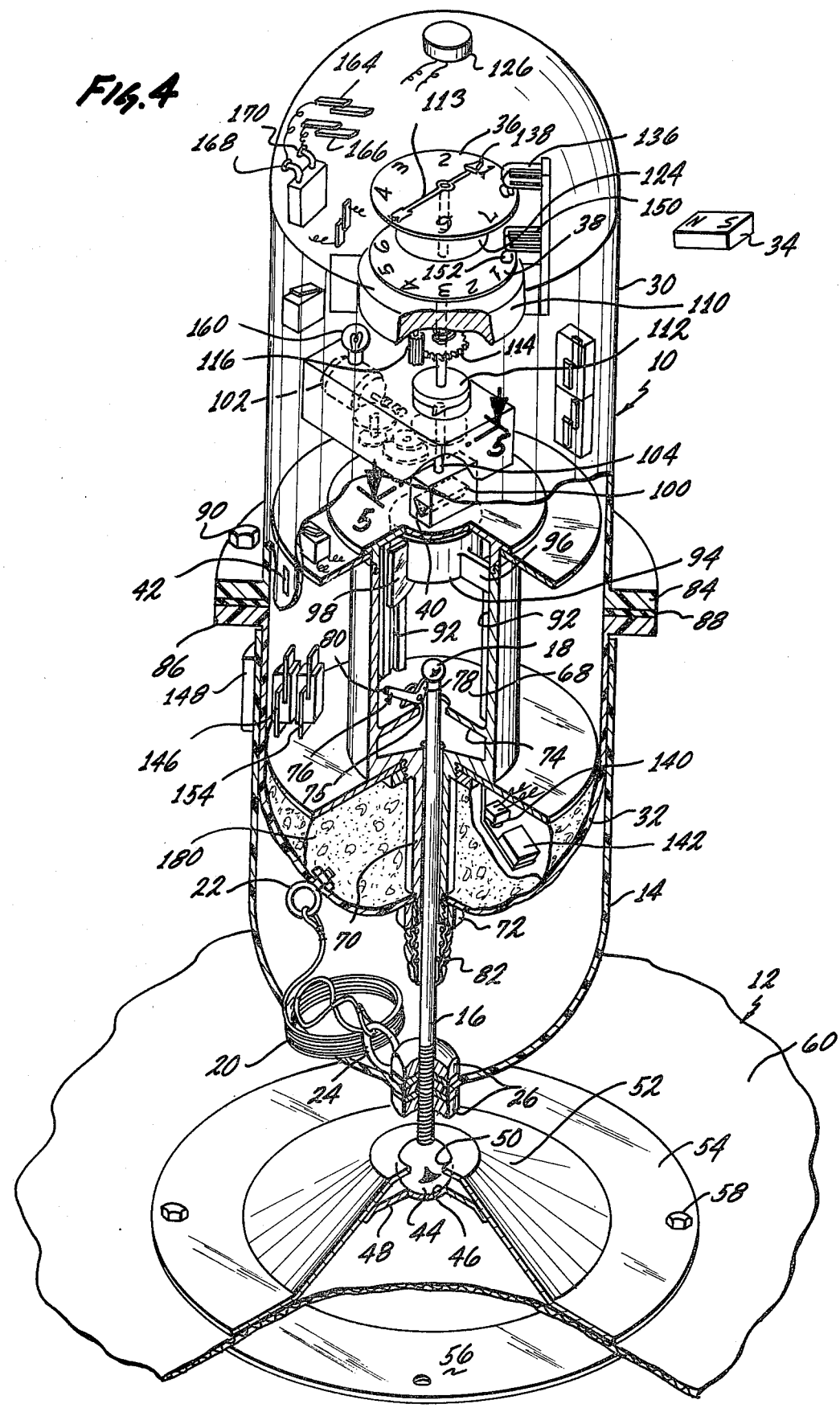
FIG. 4 is an enlarged perspective view of the buoy and of the mounting therefor, certain parts being cut away to reveal interior details. A magnet is shown in the upper right hand corner, which is used to operate interior magnetic reed switches.

Whereas my buoy 10 could have other uses, I devised it for use with a lobster or crab trap 12. Buoy 10 is received in a cupped housing or case 14 which has a central, upstanding, rod-shaped trigger pin 16 with a ball upper latching end 18 to facilitate latching of buoy 10 in housing 14. Trigger pin 16 is used to attach or latch buoy 10 in housing 14 to attach buoy 10 to trap 12 as shown in FIG. 1. When buoy 10 is unlatched from housing 14 and trap 12, as shown in FIG. 2, buoy 10 is still tethered to housing 14 and trap 12 by a nylon or other line 20 which is attached to buoy 10 by eyelet 22 and is attached to the housing structure by eyelet 24 which is secured to one of a pair of nuts 26 that secure trigger pin 16 to housing 14. Housing 14 should be at least enough larger than the mating portion of buoy 10 so as to provide room for coiling of line 20 in housing 14 in the FIG. 1 latched disposition of the assembly. Of course line 20 should be long enough to reach the surface of the water to be visible to mark the location of trap 12 when it is desired to reveal that location.

Incidentally, certain parts to be described are made of metal but it is preferred that housing 14 and the upper and lower sections 30, 32 of the shell of buoy 10 can be made of plastic. This is because certain internal switches are operated from external of buoy 10 with a permanent magnet (or possibly an electromagnet) 34 so use of plastic avoids iron containing metals of magnet 34. In fact, at least part of upper buoy case 30 should be transparent so that an operator can see upper and lower internal timer or clock dials 36, 38 and the alignment of pointer 40 with a clocking index mark 42 on transparent case section 30.

Suitably secured to the lower end of trigger rod 16 is a hard plastic ball 44 which pivots within an envelope defined by a rest 46 in a lower plate 48 and the edges of an opening 50 in an upper plate 52 secured to the top 60 of trap 12 (which is usually formed of wire) by sandwiching the trap top 60 between a flange 54 on plate 52 and a lower annulus 56 which are secured together by bolts 58.

Ball 44 permits buoy 10 and housing 14 to pivot rather freely relative to plate 52 and trap 12 to relative positions such as are illustrated in FIGS. 1–3 due to irregularities in the sea bottom that trap 12 must rest upon as shown in FIGS. 1 and 2 or due to tumbling as trap 12 descends to the bottom so that it might rest on a side as shown in FIG. 3.

For buoy 10 to release (to slide off trigger pin 16) under the force of the buoy's buoyancy, upon unlatching, factors to be considered include: (a) the functional forces along pin 16 and (b) the vector along the axis 62 of trigger pin 16 of the force of buoyancy (the vector relating to the angle between axis 62 and the vertical 64). See FIG. 3. Line 66 represents a limit of 45° of swivel of ball 44 according to one design of the buoy 10 (45° being the angle between the pin axis and the plane of the trap top 60). If the plane of the trap top 60 were rotated 100° from horizontal, trigger pin axis 62 would be 55° to the vertical 64. Tests show in one configuration of my buoy that a suitably positive buoy release is achieved at the 55° angle to the vertical shown in FIG. 3.

The structure relating to receiving and securing trigger pin 16 in buoy 10 include a housing forming trigger chamber 68, a boss 70 depending from chamber 68 having a passageway receiving pin 16, a nut 72 on boss 70 securing it to the bottom of lower buoy shell 32, and a medial web 74 supporting a pivot pin 75 on which trigger 76 is pivotally mounted (there being a light spring, not shown, normally biasing trigger 76 towards latched position under trigger ball 18). It will be readily recognized that as trigger pin 16 passes upwards through the passage in boss 70 and enters chamber 68, that the latching arm 78 will catch under ball 18 and will hold pin 16 until trigger 76 is released by downward pressure on trigger arm 80.

Trigger chamber 68 is water tight as to prevention of water in chamber 68 entering other areas of the interior of buoy 10. On occasion, water will enter chamber 68 through the passage in boss 70 but air will be compressed in chamber 68 in the process and water should be confined mostly to the area underneath medial web 74.

Other details of the case of buoy 10 and the installation of chamber 68 therein will mostly be obvious from the drawings and those details won't be belabored herein in most instances. A spring-loaded bellows 82 is attached to pin 16 and bears on the bottom of nut 72 to pretty well seal against water entry into chamber 68 until trigger release. Upper and lower buoy shell sections 30, 32 have flanges 84, 86, respectively, with an annular seal 99 sandwiched therebetween, and secured by bolts 90.

TRIGGER RELEASE MECHANISM

Figure 6:
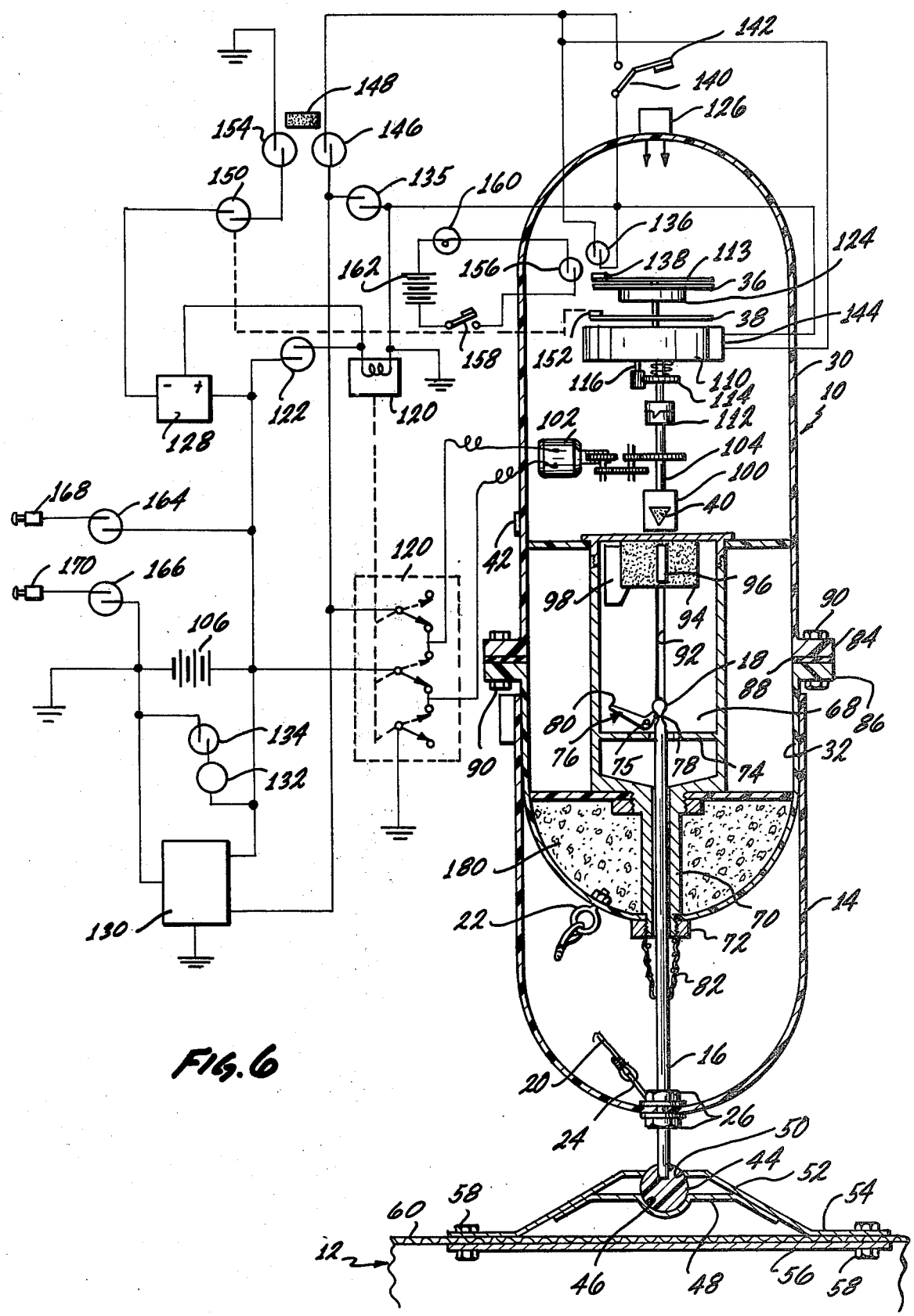
FIG. 6 is a view relating electrical circuitry to some of the structural and mechanically operating parts of the buoy assembly.

It will be understood from FIGS. 4 and 6 that buoy 10 will be released if trigger arm 80 is downwardly pressed, thereby releasing ball 18 on trigger pin 16 from engagement by latch arm 78 of trigger 76.

A pair of diametrically opposite grooves or tracks 92 are provided on the inside walls of chamber 68 and a body 94 has opposed guide members 96 disposed in grooves 92, whereby body 94 is guided in vertical movement above trigger 76.

The portion 98 striking trigger arm as body 94 falls on trigger 76 may be a weight (as body 94 is weighted). In one configuration, considering the amount of weight of body 94 and striker 98, the distance it falls, and a fulcrum ratio of seven to one (length of arm 80 to length of arm 78), a total force of about seventy pounds is available to release latch 78 from ball 18 (ten pounds at impact point times seven to one ratio). The natural buoyancy of buoy 10 will then lift the buoy out of case 14 and unwinding the Nylon line 20 stored in case 14 until buoy 10 surfaces to mark the location of trap 12.

Weighted body 94 is permanently magnetic or includes a permanent magnet as indicated in the drawings by north-south pole indications "N" and "S" on body 94. Superposed to the top of chamber 68 and above body 94 is a permanent magnet 100 or a member containing a permanent magnet. Magnet 100 and the magnetic properties of body 94 have sufficient strength to hold body 94 up at the top of chamber 68 when magnet 100 has a N-S relationship to S-N of body 94 as is indicated in FIGS. 4 and 5. As magnet 100 rotates relative to body 94 (see generally a ninety degree rotation from the relative dispositions in FIG. 4 to the relative positions in FIG. 6), at some point there will be insufficient attraction and body 94 will fall, whereby striker 98 strikes trigger arm 80 releasing the buoy. Note that body 94 will be starting to fall by the time the ninety degree FIG. 6 relative position of the poles of body 94 and magnet 100 is reached. In a prototype, release of body 94 occurred at about eighty degrees, but in any design the angular point of release will depend on various factors such as weights, strength of magnets and frictional forces.

From the foregoing, it will be understood that release of buoy 10 depends on the angular clocked position of magnet 100, i.e., as magnet 100 rotates from a supportive position to body 94, it will reach a point releasing body 94. When pointer 40 on magnet 100 is aligned with an index marker 42 visible through the transparent case section 30, the assembly is in latched position. In resetting the mechanism, therefore, usually magnet 100 will be rotated to the latched position wherein pointer 40 is aligned with index 42.

At the end of a cycle, when buoy 10 is unlatched, the assembly can be brought back to position latching buoy 10 if magnet 100 is rotated to align pointer 40 with index 42, if trigger pin 16 is inserted through the passage of boss 70 until ball 18 is in position to be engaged by latch 78, and if the assembly is inverted so that body 94 moves by gravity from a position engaging trigger arm 80 to a position at the other end of chamber 68 where it will be held by magnet 100 once the assembly is restored to normal position.

Note that the use of magnets 94, 100 achieves control of buoy attachment without breaking the water tight integrity of the interior of buoy 10 (outside of chamber 68). That is an objective of my invention. I have not recited or detailed all aspects of sealing the interior of buoy 10, but such details will be obvious.

MOTOR AND CLOCK ASSEMBLY

An electric motor 102 has an output shaft 104 secured to magnet 100, whereby magnet 100 is pivoted in its unlatching, resetting, etc., functions as motor 102 is energized. As economy is especially important in a buoy for a lobster trap, I prefer to use an off-the-shelf low-priced motor 102 operable on 6 volts from a battery pack 106 which can include eight "D" cell batteries packed in buoy case section 32 around chamber 68. Also in the interest of economy, clock or timer 110 can be a low-priced off-the-shelf battery-operated clock, powered from a 1.5 volt source, not shown.

It will be understood that as motor 102 is powered in a forward direction, magnet 100 pivots. A saw tooth gear 112 is interposed between motor 102 and a gear 114 engaging a gear on the set-time staff 116 of clock 110. When motor 102 runs in a normal forward direction, saw tooth gear 112 disengages connection to set-time staff 116 but when motor 102 runs in a reverse direction, saw tooth gear 112 transmits power from motor 102 to the set-time staff 116 and the clock or timer 102 resets rotating dial 38 and pointer 113 on stationary dial 36. This means that motor 102 in a forward direction rotates only magnet 100 but motor 102 in a reverse direction resets timer dial 38 and resets pointer 113 above dial 36. As motor 102 in a reverse direction also rotates magnet 100, in settng up the apparatus for operation, first motor 102 is used in a reverse direction to set dial 38 and pointer 113 and then, second, motor 102 is used in a forward direction to rotate magnet 100 to a zero position with pointer 40 aligned with index 42. If a second saw-tooth gear connection, reversed from that of gear 112, were used between motor 102 and magnet 100, then in one direction motor 102 would only set the timer and in the other direction would only pivot magnet 100.

ELECTRICAL CIRCUITRY

One objective of my invention is to preserve the water tight integrity of the inside of the buoy (outside of chamber 68) by not having to penetrate the buoy case for most operations, such as resetting timers. My electrical circuitry provides, therefore, for operating internal electrical circuitry from outside of the buoy case by the use of a hand-held permanent magnet (or electromagnet) 34 (see FIG. 4) and by the use of certain magnetic reed switches internally of the buoy, i.e., when magnet 34 is held in proximity to the location of a magnetic reed switch inside the case of buoy 10, that switch will close.

A relay 120 is provided. Its only function is to reverse motor 102, by shifting the voltage polarity to the motor, when it is desired to run motor 102 in the reverse direction in setting timer 110. The closing of the motor-reversing magnetic reed swtich 122 operates relay 120.

Lower timer dial 38 will rotate twice in a day. Reduction gearing 124 reduces the two revolutions daily of the clock to eight days for pointer 113 reading on the face of upper timer dial 36. Clock 110 can provide three functions: (a) turn on a receiver twice a day, (b) trigger the buoy 10 at a preset time and (c) turn on a flashing light at a selected time.

If desired, the buoy 10 can be released acoustically as well as by preset time. In that case a source of an acoustical signal can be used to transmit a signal (received by receiving hydrophone 126 which inputs to receiver 128) to initiate release of buoy 10. Hydrophone 126 should be of fairly flat response to cover a wide range of frequencies so that the receiver oscillator may be tuned to a selected frequency in order that a submerged buoy 10 will only be triggered to surface in the event the right signal is broadcast.

A low voltage circuit cartridge 130 connects across power pack 106 should the voltage drop sufficiently, i.e., for example, from six volts to four volts. In that case, the circuit past cartridge 130 energizes motor 102 to ground through relay 120 and motor 102 rotates magnet 100 to release buoy 110. A voltage meter 32 can be read through transparent case section 30 when activated by a magnetic reed switch 134 operated by external magnet 34.

Set trigger switch 135, motor-on switch 136 (operated by a magnet 138 on pointer 113 above upper dial 36), leak detector switch 140 (having a float 142), and a clock failure switch 144 are all wired in parallel with each other to ground. The closure of any of these switches will energize motor 102 by completing the circuit to ground, in most cases resulting in rotation of magnet 100 to surface the buoy. Set trigger switch 135 is a magnetic reed switch operated by hand-held magnet 34. Leak detector switch 140 surfaces the buoy 110 in case of leakage, before parts become inoperative and trap and buoy are lost at the bottom of the sea. The clock failure switch 144 likewise surfaces the buoy in case of malfunction.

Power on-off switch 146 is in series with switches, 136, 140 and 144 and is normally held closed by a magnet 148 on housing 14. After buoy 10 is released, magnet 148 no longer operates on switches 146 and motor 102 ceases to function as there no longer is a path of current to ground.

A receiver-on magnetic reed switch 150 is mounted next to the twelve-hour dial 38 in position to be operated upon by a magnet 152 on dial 38. Receiver-on switch 150 is shown to be in series with a power on-off switch 154 and with receiver 128 for simplicity of understanding. (Power on-off switch 154, like power on-off switch 146, is closed by magnet 148 on housing 14 when buoy 10 is in place in housing 14). As the twelve-hour dial 38 rotates, magnet 152 closes switch 150 for a period like an hour each time magnet 152 closes switch 150. The purpose is for the receiver to be on for one hour once every twelve hours thus conserving energy of power pack 106. By observing dial 38 before placing buoy 10 in the water, the user will be aware what hours the receiver will be on to receive signals.

A flashing light reed switch 156 is mounted adjacent to motor-on switch 136 and is acted upon by the same magnet 138 on the eight day dial 36. Switch 156 is in series with a magnetic on-off switch 158, a flashing light 160 and a separate 18-volt power pack 162. A separate power pack is required as the energy used by the flashing light will exhaust its power pack in about nine hours, requiring that batteries be changed frequently, whereas the power pack for motor, clock and receiver should last about a year. The purpose of flashing light 160, if used, of course is to make a floating buoy more visible especially at night.

Should the user desire to use NICAD batteries, magnetic reed switches 164, 166 are connected across the six-volt power pack 106 for recharging. Mounted through the case of buoy 10 are two brass terminals 168, 170 to connect with the charging source. Of course switches 164, 166 are operated by hand held magnet 34 at the time of recharging.

As will be understood by those working in the art, some of the above-described circuits and features obviously are optional systems, used to conserve power, to avoid loss of buoy and trap in case of loss of power or malfunctioning of certain other systems, to avoid need to open up the buoy case for certain operations or functions, to provide for optional acoustical operation, to facilitate use of an exonomical clock and motor, etc.

The lower part of buoy case 38 is filled with a cement ballast 180, except for room for leak detector switch 140, so that buoy 10 will float upright.

The construction and operation of my invention will be comprehended from the foregoing description.

Having thus described my invention, I do not wish to be understood as limiting myself for the exact construction shown and described. Instead, I wish to cover those modifications of my invention that will occur to those skilled in the art upon learning of my invention and which are within the proper scope thereof.

I claim:

1. The method of setting an electrically powered release timer on a buoy attached to an object to which it is also tethered by a line, comprising:
   (a) confining said timer against water penetration but not against magnetic field penetration,
   (b) providing in the confined space a magnetically sensitive timer switch, and
   (c) operating said switch magnetically from outside the confined space so as to set the timer without exposing said timer to water penetration.

2. The improvement in means for attachment and release of a buoy relative to an object to which the buoy is also tethered by a line, comprising:
   (a) means operative to attach said buoy to said object including a latch releasable by a trigger,
   (b) a weighted body and guide means therefor whereby said body is movable by gravity from a first position above and spaced from said trigger to a second position striking said trigger and releasing said latch whereby said buoy is released from said object and assumes a tethered position,
   (c) means operative to hold said weighted body in said first position until release of said weighted body to trigger buoy release to tethered disposition, and
   (d) said means operative to hold said weighted body including a first permanent magnet forming a part of said weighted body and a second permanent magnet disposed adjacent to said first magnet and means pivotally supporting said second magnet to pivot between a first position in which the poles of said second magnet are supportively disposed relative to the poles of said first magnet to hold said weighted body in said first position thereof and a second position in which the poles of the two magnets are relatively oriented so as to permit said weighted body to drop from said first position thereof to said second position to release said buoy, and means operative to pivot said second magnet between said first and second positions thereof to initiate release of said buoy.

3. The subject matter of claim 2 in which said second magnet is superposed to said first magnet and is pivotal about an axis generally parallel to the path of travel of said weighted body from said first position to said second position thereof.

4. The subject matter of claim 2 in which said means operative to pivot said second magnet includes timing and driving means pivoting said second magnet upon reaching of a time set into said timing and driving means.

5. The subject matter of claim 4 in which said timing and driving means includes an electric motor operative to pivot said second magnet and an electric clock controlling when said motor is energized.

6. The subject matter of claim 5 in which there is a housing and said electric motor, electric clock and second magnet are enclosed in said housing which is sealed to prevent water entry, there being magnetic reed switch means controlling setting of said clock and there being wall means adjacent to said magnetic switch means magnetically pervious whereby said clock can be set externally of said housing without disturbing sealing thereof by use of a hand-held magnet.

7. The subject matter of claim 6 in which there are means to operate said electric motor to pivot said second magnet to release said weighted body in the event of leakage of water into said housing, in the event of mechanical clock failure and in the event of reduction of voltage to said motor below a selected value.

8. The subject matter of claim 5 in which there is first battery means powering said electric motor and said second battery means separate from said first battery means powering said electric clock, said motor and clock being off-the-shelf products thereby minimizing costs.

9. The subject matter of claim 8 in which there is means connecting said motor to said clock including a saw tooth gear whereby said motor will set said clock when said motor is run in a reverse direction and disengaging said motor from said clock when said motor is run in a forward direction whereby said clock will not be disturbed when said motor is run in a forward direction in initially setting relative positions of said magnets and in pivoting said magnet to release said weighted body.

10. The subject matter of claim 9 in which said electric motor, electric clock, second magnet and battery means are enclosed in a housing sealed to prevent water entry and there are relay means in said housing controlling reversal of said motor and a magnetic reed switch in said housing controlling said relay means and operable by magnetic means external of said housing such as a hand-held magnet.

11. The subject matter of claim 5 in which there is a power-on-off switch cutting off power to said motor upon release of said buoy.

12. The subject matter of claim 5 in which there is a flashing light on said buoy and means operative to turn on said light upon said clock initiating release of said buoy, said motor being powered by first battery means and said clock being powered by second battery means separate from said first battery means and there being third battery means powering said light separate from said first and second battery means.

13. The improvement in means for attachment and release of a buoy relative to an object to which the buoy is also tethered by a line, comprising:
   (a) releasable attaching means operative to secure said buoy to said object,
   (b) an electric timer operative to control release of said attaching means,
   (c) a housing and said timer being disposed in said housing which is sealed to prevent water entry, said housing having a magnetically pervious wall, and
   (d) means including a magnetic reed switch disposed in said housing near said wall and controlling setting of said timer, whereby said timer may be set by a hand-held magnet external of said housing adjacent to said wall without disturbing the housing seal.

14. The subject matter of claim 13 in which there is means operative to release said attaching means responsive to leakage of water into said housing.

15. The method of latching and releasing a buoy relative to an object to which the buoy is also tethered by a line, in which there is a latch released by a trigger, comprising:
   (a) providing a weight and attaching a first permanent magnet to the weight,
   (b) locating said weight above said trigger,
   (c) holding said weight above said trigger by magnetically operating on said first permanent magnet to hold it up, and (d) releasing said weight to descent by gravity to strike said trigger to release said buoy by changing magnetic operation on said first permanent magnet to no longer hold it up.

16. The subject matter of claim 15 in which said first permanent magnet is magnetically operated upon to hold it up and to release the same by superposing a second permanent magnet to said first permanent magnet and orienting the poles of said second magnet to attract the poles of said first magnet when it is desired to hold said weight up and changing pole orientations between second and first magnets to a non-supportive relationship when it is desired to release said weight.

17. The improvement in means for attachment and relesae' of a buoy relative to an object to which said buoy is attached and to which said buoy is also tethered by a line, comprising:
(a) said means for attachment and release including a first and a second permanent magnet and means supporting said magnets for relative rotation to pivot from a first relative position in which the poles of the magnets are oppositely positioned to attract each other to hold the magnets together against release to a second relative position in which the poles of the magnets are no longer oppositely positioned so as to no longer hold the magnets together, said means for attachment and release being operative to release said buoy from attachment to said object responsive to change in attraction of said magnets to each other as said magnets move from said first position towards said second position, and
(b) timing and driving means operative to relatively rotate said magnets from said first position to said second position upon reaching a preset time.

18. The subject matter of claim 17 in which said timing and driving means is electrically powered and includes an electric motor and an electric timer which can be preset; there being a magnetic switch controlling setting of said electric timer; there being a housing sealed to prevent water entry enclosing said motor, said electric timer, and said magnetic switch; and said housing including a magnetically pervious wall located so that said magnetic switch can be operated by a source of a magnetic field external of said housing without disturbing the sealing of said housing.

19. The subject matter of claim 18 in which said electric timer includes a display of time to indicate when said electric timer will operate said electric motor to relatively rotate said magnets, and said housing including a transparent wall so that said display can be read from external of said housing without disturbing the sealing of said housing.

20. The subject matter of claim 17 in which said magnets are superposed and are rotatable about an upright axis.

* * * * *